Patented June 8, 1943

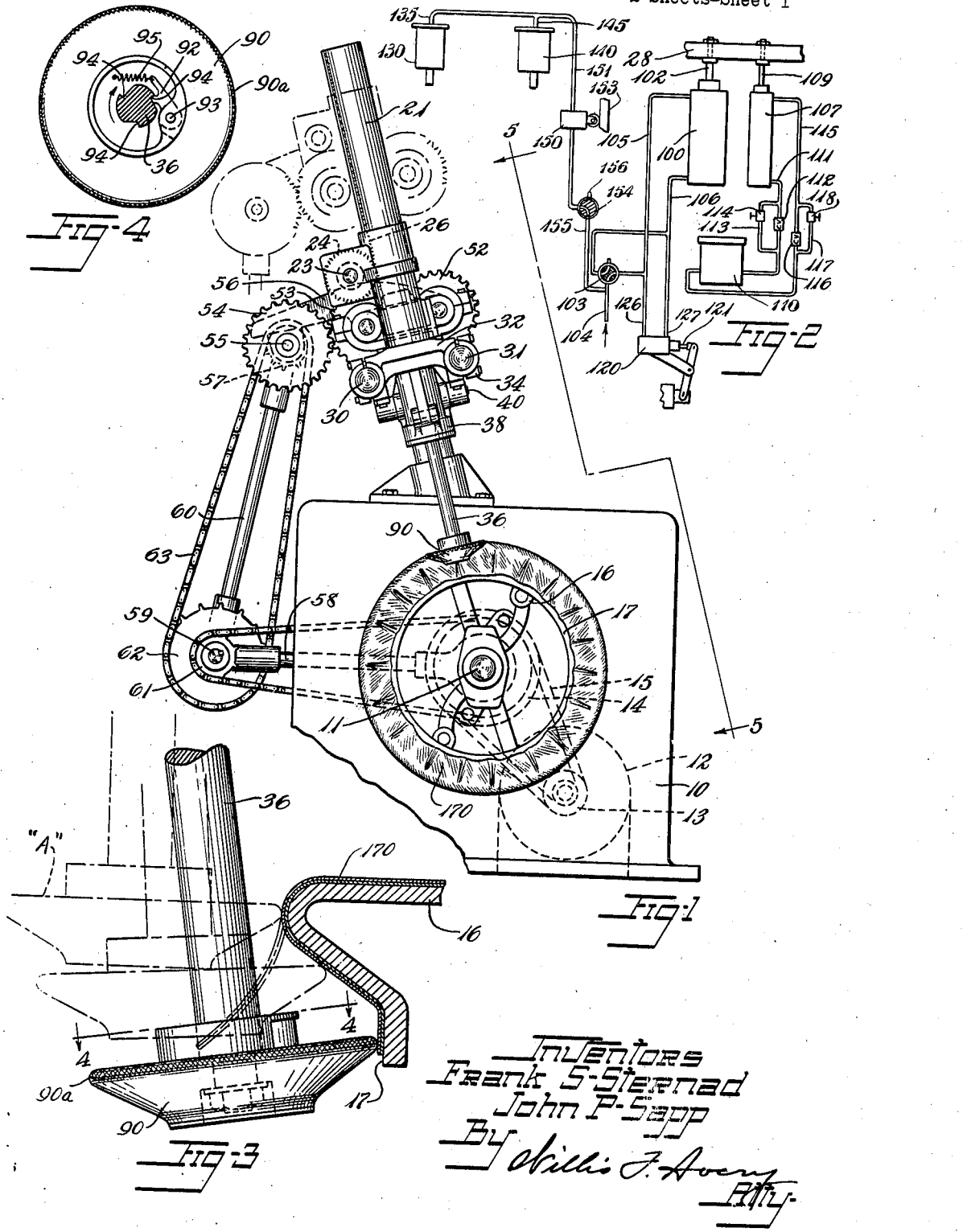

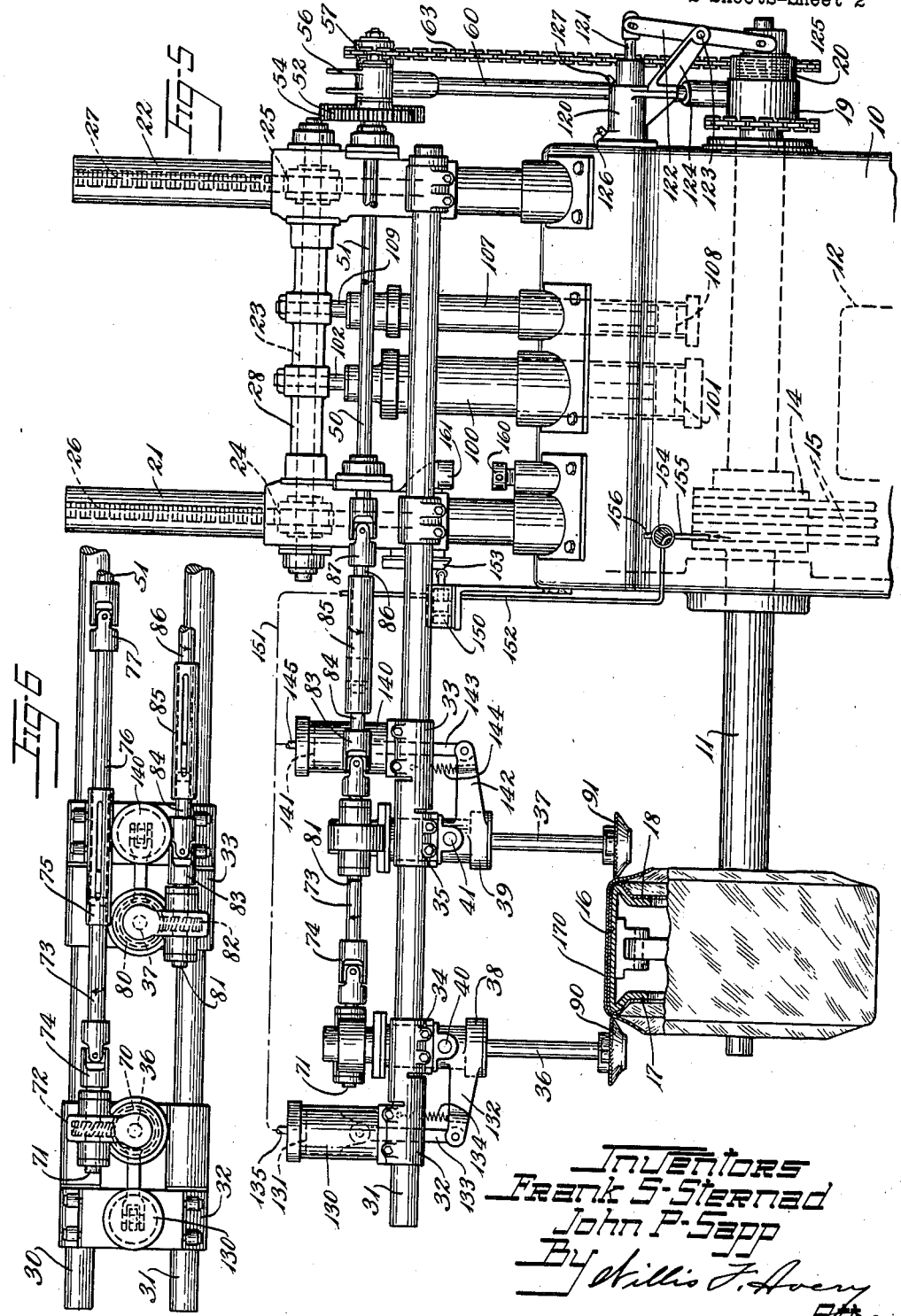

2,321,163

UNITED STATES PATENT OFFICE 2,321,163

APPARATUS FOR BUILDING TIRES

Frank S. Sternad, Cuyahoga Falls, and John P. Sapp, Kent, Ohio, assignors to The B. F. Goodrich Company, New York, N. Y., a corporation of New York Application December 9, 1941, Serial No. 422,243

14 Claims. (Cl. 154—10)

This invention relates to tire building apparatus and more especially to apparatus for stitching sheet material about the sides of a rotatable form having side forming faces.

In the manufacture of tires of relatively large cross section by the drum building process it has been found necessary to employ very wide forms or drums having undercut side faces. In one method of building the rubberized cord material is furnished to the tire builder as an endless band of a pair of crossed plies of bias laid cords. The band is forced over the drum with its margins overhanging and these margins must be stitched smoothly to the undercut sides of the drum. In order to apply the material smoothly at the side faces it must be reduced in circumference and stitched down, necessitating a crowding of the cords closer together and unless this is accomplished uniformly the material is folded upon itself in irregular pleats causing undesirable thickening of the carcass in local areas and providing non-uniform strength.

It is an object of the invention to provide power-driven stitcher means for imparting a wiping action to material on the side of a driven form, which wiping action is progressively increased toward the axis of the form from a determinate radial position, together with means assuring little or no wiping action upon contact of the stitcher with the material radially outward of such position. By this provision, the power-driven stitcher can be brought into initial contact with the material at a radially outermost position and the wiping action nevertheless will not begin until the stitcher reaches the desired radial position from which the wiping action will increase as the stitcher advances toward the axis of the form.

Further objects are to provide power-driven stitching wheels having free running means, to provide independent pivoting of the stitcher wheel supports, to provide independent pressure means for holding the stitcher wheels against the material with substantially uniform pressure, to provide substantially automatic control of the stitcher wheels, to provide hydraulic feed of and return of the stitcher wheels, and generally to provide improved operation.

These and other objects will appear from the following description and the accompanying drawings.

Of the drawings,

Fig. 1 is an end elevation of a tire building machine embodying the invention, the stitcher supporting mechanism being shown in full lines at the position where the stitchers first contact the drum and the raised position thereof being indicated in dot and dash lines, parts being broken away.

Fig. 2 is a piping diagram.

Fig. 3 is a detail view of one of the stitcher wheels, the margin of a drum with the cord material stitched thereon being shown in section, the final stitching position being shown in full lines and other positions being shown in dot and dash lines, the position of the material at the start of the stitching operation being indicated in dot and dash lines, parts being broken away.

Fig. 4 is a cross sectional view taken on line 4—4 of Fig. 3.

Fig. 5 is a front view of the machine of Fig. 1 taken on line 5—5 thereof, parts being broken away.

Fig. 6 is a detail plan view of the stitcher carriage, parts being broken away.

In the illustrative embodiment of the invention, a tire-building drum is supported and rotated while a pair of stitcher wheels are fed radially across its end faces toward its axis. The stitcher wheels are power-driven in a direction corresponding to the direction in which they would roll along the surface of the drum, and at such a speed with relation to that of the drum at its periphery that before initial contact with the drum the wheels will have a surface speed due to rotation of their shafts less than that of the material on the drum and upon contact of the drum will be driven by the drum at its surface speed and as the wheels are fed radially of the drum the speed of the surface drum at the position of contact will be progressively less than the surface speed of the wheels due to their being driven by their shafts so that a progressively increasing wiping action on the material will occur, while free running means are provided to enable the wheels to roll upon the material on the drum without wiping action over a determinate initial zone beginning with the position of initial contact. The stitcher wheels are each supported independently and are independently pressed against the material on the drum.

Referring to the drawings, the numeral 10 designates the frame of a tire building machine which rotatably supports a horizontal spindle 11 journaled therein. An electric motor 12 is mounted on the frame and has a sheave 13 which is adapted to drive a sheave 14 fixed to the spindle 11, a plurality of V-belts 15 being arranged about the sheaves for transmitting motion from the motor to the spindle. A tire building drum 16 having undercut marginal side forming faces 17, 18 and of the collapsible type, is fixed to one end of the spindle beyond the frame. A sprocket wheel 19 is rotatably mounted on the opposite end of the spindle and is adapted to be frictionally engaged by the spindle through a clutch 20 mounted on the spindle.

For supporting the stitcher wheels for movement radially of the drum, a pair of guide pillars 21, 22 are fixed to the frame 10 in parallel relation and extend radially of the spindle in the same plane. For convenience these pillars are inclined to the vertical so as to provide head room for the operator. A crosshead 28 is mounted for sliding movement on the pillars, and to assure smooth sliding without binding a horizontal shaft 23 is journaled in bearings formed on the cross-head, and a pair of pinions 24, 25 of equal size, are fixed at opposite ends of the shaft respectively and engage racks 26, 27 fixed to the pillars.

Fixed to the crosshead 28 are a pair of parallel bars 30, 31, which extend over the drum 16 to support the stitcher mechanism. A pair of yokes 32, 33 are slidably mounted on bars 30, 31 and may be clamped thereto in any desired position by clamps 34, 35 to accommodate tire building drums of different widths. The stitcher shafts 36, 37 are rotatably mounted in brackets 38, 39 which have trunnion pintles 40, 41 at right angles to the shafts and journaled in the yokes 34, 35 so that the brackets may rotate on axes perpendicular to the axes of the stitcher shaft.

For rotating the stitcher shafts at any position, a pair of shafts 50, 51 are mounted horizontally for rotation parallel to each other in bearings formed on crosshead 28 and have intermeshing spur gears 52, 53 fixed thereto respectively. A third spur gear 54 is journaled on a stub shaft 55 fixed to a bracket 56 mounted on the ends of shafts 50, 51 so that gear 54 meshes with gear 53. Gear 54 has a sprocket 57 fixed thereto. A swing frame 58 has a bearing at one end pivoted on spindle 11 and a parallel bearing at its opposite end for rotatably supporting a shaft 59. A second swing arm 60 is pivoted at one end on shaft 59 and at its other on shaft 55. A sprocket 61 is fixed to shaft 59 and is driven from sprocket 19 on spindle 11. A second sprocket 62 is fixed to shaft 59 and a chain 63 thereabout drives sprocket 57. The arrangement is such that shafts 50, 51 are positively driven from spindle 11 at any elevation of crosshead 28.

Stitcher shaft 36 has a helical gear 70 fixed to its upper end. A horizontal shaft 71 is journaled in bracket 38 and has a helical gear 72 fixed thereto in a position to mesh with gear 70. A shaft 73 has one end connected to shaft 71 by a universal joint 74, and its other end connected for driving by a slip sleeve 75 fixed to a shaft 76 which is connected by a universal joint 77 with shaft 51. The arrangement is such that shaft 36 is driven by shaft 51 at any position of yoke 34 and may swing simultaneously on pintles 40.

Shaft 37 has a helical gear 80 fixed thereto. A horizontal shaft 81 is journaled in brackets 39 and has a helical gear 82 fixed thereto in position to mesh with gear 80. A universal joint 83 is fixed to shaft 81 and is adapted to be driven by a shaft 84, slip sleeve 85, a shaft 86, and a universal joint 87 mounted on the end of shaft 50. The arrangement is such that shaft 37 is driven from shaft 50 at any position of yoke 33 and shaft 37 may simultaneously be swung on pintles 41. Due to the meshing of gears 52, 53 stitcher shafts 36, 37 are rotated in opposite directions.

Stitcher wheels 90, 91 are preferably of truncated conical shape with their flat sides turned away from the drum. Their perimeters are rounded as at 90a and are preferably knurled as shown so as to provide better traction with respect to the material on the drum. Each stitcher wheel is rotatably mounted on its shaft and is provided with an overrunning clutch in the form of a driving ratchet 92 pivoted thereto by a pin 93 and adapted to engage driving notches 94 formed in the shaft. A coil spring 95 has one end fixed to the stitcher wheel and the other end fixed to the ratchet 92. The arrangement is such that the stitcher wheels are driven by the shafts 36, 37 but may be turned in their direction of rotation with respect to the shafts.

The gearing is proportioned to provide the desired surface speed to the stitcher wheels. A desirable speed condition is such that at initial contact of the wheels with the material on the periphery of the drum the stitcher wheels will have a surface speed, due to their being driven by their shafts, less than that of the surface of the drum so that the material on the drum upon contact with the stitcher wheels is not greatly disturbed by such contact and the material on the drum by contact with the stitchers increases the surface speed of the stitchers so that free running occurs until the stitcher wheels have progressed radially inward to a position, such as the position illustrated at A in dot and dash lines in Fig. 3, where it is desired that the wiping action begin. Here the surface speed of the material on the drum equals the speed of the stitcher wheels imparted by rotation of shafts 36, 37 at which position free running ceases. From that position throughout the remainder of the radially inward travel of the stitcher wheels, the surface speed of the drum at the position of contact is progressively less than the surface speed of the wheels, resulting in wiping action or uniform compacting of the material circumferentially of the drum, and even application of the material.

For feeding the stitcher wheels radially of the drum, a double-acting fluid pressure cylinder 100 is fixed to the frame 10 and is fitted with a piston 101 connected by a piston rod 102 with the crosshead 28. A four-way valve 103 is mounted for convenient manipulation by the operator and is supplied by a pressure line 104 from any convenient source of pressure (not shown). Lines 105, 106 connect opposite ports of the valve with opposite ends of the cylinder. The arrangement is such that in one position of the valve fluid pressure is supplied from line 104 to the lower end of the cylinder to raise the crosshead 28 and the stitcher wheels, and in another position of the valve, pressure fluid is supplied from line 104 to the upper end of the cylinder to lower the crosshead 28 and feed the stitcher wheels downwardly across the side faces of the drum.

To regulate the velocity of travel of the crosshead a second double-acting cylinder 107 is fixed to frame 10 with its piston 108 connected by a piston rod 109 to the crosshead 28. The lower end of cylinder 107 is connected to a container 110 by a line 111 having a check valve 112 therein. A by-pass line 113 about the check valve has a speed control valve 114 therein. The upper end of cylinder 107 is connected with the container 110 by a line 115 having a check valve 116 therein. A by-pass line 117 about check valve 116 has a speed control valve 118 therein. The entire system is filled with oil or other relatively non-compressible liquid and the check valves are arranged to oppose flow from the cylinder 107 to the container 110 and permit free flow from the container to the cylinder. The arrangement is such that when the cylinder 100 raises the crosshead, liquid from the upper end of cylinder 107 is forced through valve 114 which may be adjusted to regulate the speed of travel, and when cylinder 100 lowers the crosshead, liquid from the lower end of cylinder 107 is forced through valve 112 which may be adjusted to regulate the speed of downward movement, and the valves may be adjusted to permit a slow downward feed of the stitched wheels and a faster return thereof.

For operating the clutch 20, a double-acting fluid pressure operated cylinder 120 is mounted on frame 10 and its piston rod 121 is pivotally engaged by one end of a clutch shifter lever 122 pivoted at 123 on a bracket 124 fixed to frame 10. The other end of the shifter lever is pivotally connected to a clutch collar 125 adapted to engage and disengage the clutch. One end of cylinder 120 is connected by a pipe 126 with pipe 105. The opposite end of cylinder 120 is connected by a pipe 127 with pipe 106. The arrangement is such that when valve 103 is operated to lower crosshead 28 cylinder 120 is operated to engage clutch 20 and rotate the stitcher wheels and when valve 103 is operated to raise crosshead 28 cylinder 120 is operated to disengage the clutch.

For pressing the stitcher wheels against the side faces of the drum, a single-acting cylinder 130 is fixed to yoke 32 and has a piston 131 pivotally connected to an arm 132 of bracket 38 by a connecting rod 133. A tension coil spring 134 is connected between arm 132 and yoke 32. The arrangement is such that when air pressure is supplied to cylinder 130 through a port 135, the piston is forced downwardly swinging the stitcher wheel 99 toward the drum 16 and when air is exhausted from the cylinder, the spring 134 forces the stitcher wheel away from the drum.

A second similar single-acting cylinder 140 is fixed to yoke 33 and its piston 141 is pivotally connected to an arm 142 of bracket 39 by a connecting rod 143. A tension coil spring 144 is connected between arm 142 and yoke 33. The arrangement is such that when fluid pressure is admitted to cylinder 140 through port 145, stitcher wheel 91 is pressed toward the side of drum 16 and when the cylinder is exhausted, spring 144 pulls the stitcher wheel away from the drum.

A cam operated two-way valve 150 is adjustably mounted on the frame 10 for vertical adjustment and is connected by a pipe 151 with ports 135, 145 of cylinders 130, 140. A fluid pressure line 152 connects valve 150 to a manually controlled three-way valve 154. A cam 153 is fixed to crosshead 28 in position to open valve 150 as it passes it. The arrangement is such that when the crosshead is above the position shown in Fig. 5 the valve 150 is closed and at the position shown in Fig. 5 has just opened by contact with the cam 153 and remains open at any position of the crosshead below that illustrated in Fig. 5. Valve 154 is supplied from any convenient source of fluid pressure (not shown) through a pipe 155 and exhausts through a port 156. The arrangement is such that by operating the valve 154 to supply air to line 152 valve 150 is supplied with air under pressure and by operating the valve 154 to a second position line 152 will be opened to exhaust. With line 152 under pressure, valve 150 will be opened by contact with cam 153 when the crosshead 28 is lowered to the position shown in Fig. 5 and will charge cylinders 130, 140 and press the stitcher wheels against the end faces of the drum. By operating valve 154 to open line 152 to exhaust, which the operator may do at the end of a stitching operation and while valve 150 is open, cylinders 130, 140 are opened to exhaust and stitcher wheels 90, 91 are withdrawn from contact with the drum during return of the crosshead to elevated position. During the elevating movement valve 150 is closed by release of cam 153 and although the operator then operates valve 154 to charge line 152 the cylinders 130, 140 are not charged until cam 153 opens valve 150 during downward movement of the crosshead.

To limit movement of the crosshead, an adjustable stop screw 160 is threaded in the frame 10 for cooperation with a stop 161 on the crosshead.

The operation of the apparatus may be varied to suit the tire construction desired but a typical mode of operation is as follows: With the crosshead 28 in its uppermost position, valve 154 opening line 152 to exhaust, clutch 20 disengaged and spindle 11 not rotating, an endless band 170 of rubberized cord material comprising bias-cut crossed plies of cord fabric, is drawn over the drum 16 and centered with respect thereto, its margins hanging over the sides of the drum. The motor 12 is energized to drive the spindle 11. Valve 154 is operated to supply pressure fluid to line 152. Valve 103 is then manually set to supply pressure fluid to the upper end of cylinder 100 causing the crosshead 28 to descend and clutch 20 to be engaged by pressure fluid supplied to cylinder 120 through pipe 126. This causes the stitcher wheels 90, 91 to rotate in opposite directions with their edges adjacent the drum rotating in the direction that the drum is rotating but at less velocity than that of the greatest radius of the drum. Speed of the feeding movement is dependent upon setting of speed control valve 114. As cam 153 contacts valve 150, that valve opens to supply fluid to cylinders 130, 140 forcing the stitcher wheels against the sides of the drum. No scuffing of the material occurs as at initial contact the stitcher wheels are rotating at a surface speed only slightly less than that of the drum at the position of initial contact. As the stitcher wheels contact with the material they roll freely thereon as permitted by their free-running construction until their speed is equal to that of their driving spindles. From that position on during their travel they are driven at a constant speed faster than the surface with which they contact, the difference in speed being progressively increased as the stitchers move radially over the sides of the drum, evenly compacting the material circumferentially of the drum by wiping action. The material adheres to the drum due to the adhesive surface of the material. When the stitching operation is complete, the operator moves valve 154 to a position where pipe 152 is exhausted and the stitcher wheels are withdrawn laterally from the drum side faces. Valve 103 is then manipulated to raise crosshead 28 and during the raising movement valve 150 is automatically closed.

For building tires of different sizes, yokes 32, 33 may be adjusted along bars 30, 31 and clamped thereto at positions suitable for operating on drums of different widths.

Variations may be made without departing from the invention as it is defined by the following claims.

We claim:
1. Apparatus for stitching sheet material to a driven building form having a side forming face, said apparatus comprising a rotatable stitching member mounted for free rotation in one direction, and means for driving said member in such direction while permitting free rotation of said member faster than the driving speed.

2. Apparatus for stitching sheet material to a driven building form having a side forming face, said apparatus comprising a rotatable stitching member mounted for free rotation in one direction, and means for driving said member in such direction at a uniform speed with relation to the speed of the side forming face while permitting free rotation of said member faster than the driving speed.

3. Apparatus for stitching sheet material to a driven building form having a side forming face, said apparatus comprising a rotatable stitching member, means for rolling said member in a spiral path over a zone of said side forming face, and means for driving said member in a spiral path over another zone of said side forming face at a surface speed faster than the speed of the side forming face at the position of contact of said member with said side forming face.

4. Apparatus for stitching sheet material to a driven building form having a side forming face, said apparatus comprising a rotatable stitching member, means for rolling said member in a spiral path over an annular zone of said side forming face, and means for driving said member in a spiral path over a succeeding annular zone of said side forming face at a surface speed progressively faster than the speed of the side forming face at the position of contact of said member with said side forming face.

5. Apparatus for stitching sheet material to a driven building form having a side forming face, said apparatus comprising a rotatable stitching member, means for driving said member in one direction at a determinate speed, said means comprising an overrunning connection for free rotation of said member.

6. Apparatus for stitching sheet material to a driven building form having a side forming face, said apparatus comprising a rotatable stitching member, means for driving said member in one direction at a determinate speed, said means comprising an overrunning clutch for free rotation of said member.

7. Apparatus for stitching sheet material to a tire building form having side forming faces, said apparatus comprising means for driving said form at a uniform speed, a pair of rotatable stitching members mounted for contact with opposite side forming faces of said form, and means for driving said members at a uniform speed with respect to the speed of the form and in the same direction at their form-contacting faces as the direction of travel of the form surface, said last-named means comprising driving connections for free rotation of said members.

8. Apparatus for stitching sheet material to a tire building form having side forming faces, said apparatus comprising means for driving said form at a uniform speed, a pair of rotatable stitching members mounted for contact with opposite side forming faces of said form, means for feeding said members radially along said side forming faces, means for pressing said members against said side forming faces, and means for driving said members at a uniform speed with respect to the speed of the form and in the same direction at their form contacting faces as the direction of travel of the side forming faces, said last-named means comprising driving connections for free rotation of said members.

9. Apparatus for stitching sheet material to a driven tire building form, having a side forming face, said apparatus comprising a rotatable stitching member, a shaft for supporting and driving said member, and an overrunning clutch between said shaft and said member.

10. Apparatus for stitching sheet material to a tire building form having side forming faces, said apparatus comprising means for driving said form at a uniform speed, a carriage movable vertically and radially of said form, a pair of rotatable stitching members suspended from said carriage, means for feeding said carriage toward the form for advancing said stitching members radially over said side forming faces, means for pressing said stitcher wheels laterally against said side forming faces during their downward movement, and means for driving said members at a uniform speed with respect to the speed of the form and in the same direction at their form-contacting faces as the direction of travel of the form surface.

11. Apparatus for stitching sheet material to a tire building form having side forming faces, said apparatus comprising means for driving said form at a uniform speed, a carriage movable vertically and radially of said form, a pair of rotatable stitching members suspended from said carriage, means for feeding said carriage toward the form for advancing said stitching members radially over said side forming faces, means for pressing said stitcher wheels laterally against said side forming faces during their downward movement, means on said carriage for driving said members at a uniform speed with respect to the speed of the form and in the same direction at their form contacting faces as the direction of travel of the form surface, said last named means comprising driving connections for free rotation of said members.

12. Apparatus for stitching sheet material to a tire building form having side forming faces, said apparatus comprising means for driving said form at a uniform speed, a carriage movable vertically and radially of said form, a pair of rotatable stitching members suspended from said carriage, means for feeding said carriage toward the form for advancing said stitching members radially over said side forming faces, means for pressing said stitcher wheels laterally against said side forming faces during their downward movement, and means for changing the velocity of the radial advance of the stitching members.

13. Apparatus for stitching sheet material to a tire building form having side forming faces, said apparatus comprising means for driving said form at a uniform speed, a carriage movable vertically and radially of said form, a pair of rotatable stitching members suspended from said carriage, means for feeding said carriage toward the form for advancing said stitching members radially over said side forming faces, means for pressing said stitcher wheels laterally against said side forming faces during their downward movement, and means for adjusting the stitcher members with relation to the carriage to accommodate forms of different widths.

14. Apparatus for stitching sheet material to a tire building form having side forming faces, said apparatus comprising means for driving said form at a uniform speed, a carriage movable vertically and radially of said form, a pair of rotatable stitching members suspended from said carriage, means for feeding said carriage toward the form for advancing said stitching members radially over the sides of said form, means for adjusting said stitcher members laterally of the form on said carriage to accommodate forms of different widths, means for pressing said stitcher members laterally against said form irrespective of their lateral adjustment, and means for driving said members at any lateral adjustment thereof at a uniform speed and in the same direction at their form contacting faces as the direction of travel of said form, said last named means comprising driving connections for free rotation of said members at any position thereof.

FRANK S. STERNAD.
JOHN P. SAPP.